United States Patent
Breslau et al.

[11] Patent Number: 6,035,419
[45] Date of Patent: *Mar. 7, 2000

[54] LOGICAL EXECUTION SEQUENCE ERROR RECOVERY METHOD AND SYSTEM

[75] Inventors: Franklin Charles Breslau, Teaneck, N.J.; Paul Gregory Greenstein, Croton-On-Hudson; John Ted Rodell, Wappingers Falls, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/578,097

[22] Filed: Dec. 27, 1995

[51] Int. Cl.[7] .................................................. G06F 11/00
[52] U.S. Cl. ............................................. 714/20; 395/600
[58] Field of Search ..................... 395/182.18, 183.15, 395/183.14, 181, 182.14, 182.04, 182.13, 650, 600, 700; 714/20, 2, 7, 25, 31, 39

[56] References Cited

U.S. PATENT DOCUMENTS

| | | | |
|---|---|---|---|
| 5,371,742 | 12/1994 | Brown et al. | 371/7 |
| 5,379,426 | 1/1995 | Foss et al. | 395/650 |
| 5,450,579 | 9/1995 | Johnson | 395/650 |
| 5,455,951 | 10/1995 | Bolton et al. | 395/700 |
| 5,481,707 | 1/1996 | Murphy, Jr. et al. | 395/650 |
| 5,504,883 | 4/1996 | Coverston et al. | 395/600 |
| 5,519,867 | 5/1996 | Moeller et al. | 395/700 |
| 5,526,492 | 6/1996 | Ishida | 395/200.09 |
| 5,528,750 | 6/1996 | Lubart et al. | 395/182.13 |
| 5,530,861 | 6/1996 | Diamant et al. | 395/650 |
| 5,615,127 | 3/1997 | Beatty et al. | 364/489 |

*Primary Examiner*—Robert W. Beausoliel, Jr.
*Assistant Examiner*—Nadeem Iqbal
*Attorney, Agent, or Firm*—Heslin & Rothenberg, P.C.

[57] ABSTRACT

A recovery mechanism enabling recovery to be performed along logical execution paths of tasks processing within a computer system. Tasks executing within the computer system invoke one another in a logical invocation sequence. The recovery mechanism allows a task to initiate recovery for another task, such that recovery follows the logical sequence of events. The recovery mechanism is applicable to procedural, as well as object-oriented systems, and is usable with homogeneous and heterogeneous systems.

49 Claims, 9 Drawing Sheets fig. 1a fig. 2 fig. 1b fig. 3 fig. 4 fig. 5a fig. 5b fig. 6a fig. 6b fig. 6c fig. 6d fig. 6e fig. 7a fig. 7b

LOGICAL EXECUTION SEQUENCE ERROR RECOVERY METHOD AND SYSTEM

TECHNICAL FIELD

This invention relates, in general, to performing error recovery within a computer system and, in particular, to a mechanism which allows one task of a computer system to initiate recovery for another task of the system, thereby providing recovery along logical execution paths.

BACKGROUND ART

Error recovery is an important function of any computer processing system. The ability to recover from an error situation in a timely manner and in such a way that data corruption is minimized is paramount to the reliability of the computer system.

As is known, there are a number of different types of error recovery techniques. One technique that is used in some systems, such as, for instance, those computer systems running Multiple Virtual Storage/Enterprise Systems Architecture (MVS/ESA) operating system offered by International Business Machines Corporation is referred to as a stack-based technique. In particular, for each task (i.e., independent unit of execution that can be scheduled by an operating system) executing on the computer system, there is an associated stack, which includes levels of recovery services or routines for that task.

During recovery of an error, a recovery service or routine is selected from the stack particularly associated with the failed task. Specifically, the routine on the top of the stack is selected and executed, and if that routine indicates percolation, the procedural code of the system dictates that the next service or routine on that particular stack is to be selected. Thus, recovery proceeds only down the stack of the failed task.

This is a problem in those situations in which one task invokes another task. For example, assume that a task, Task A, gets invoked and an error recovery routine AE is established for the task. Error recovery routine AE is placed on Stack A. Then, Task A invokes Task B and Task B invokes a service (such as MVS' Recovery Termination Manager (RTM)) to establish an error recovery routine BE, which gets placed on Stack B (since there is a different stack for each task). Thereafter, an error occurs during execution of Task B that causes entry into error routine BE. Error routine BE wants to percolate and therefore, it will go to the next routine, if any, on its stack, Stack B. It does not percolate to the routines on Stack A, even though, in the above example, error routine AE is the next routine in logical invocation sequence.

Failing to percolate to Stack A can have catastrophic consequences for the computer system. For example, the data may be corrupted and/or uncertainty may exist in the execution of applications. Therefore, a need exists for a recovery mechanism which takes into account the logical invocation sequence of functions within the tasks. A further need exists for a mechanism which facilitates the transfer of control between different recovery units in different tasks. A yet further need exists for a mechanism that allows concurrent execution of task related and sequence related recovery. A need also exists for enabling recovery to be performed for distributed cross-system (including homogeneous and heterogeneous) functions. A yet further need exists for a mechanism that integrates procedural recovery (i.e., stack based recovery) with object-oriented technology.

SUMMARY OF THE INVENTION

The shortcomings of the prior art are overcome and additional advantages are provided through the provision of a recovery method and system in a computer system. In one example, a first task of the computer system detects an abnormal condition within the computer system and then, responsive to the abnormal condition, it initiates recovery for a second task of the system.

In a further embodiment of the invention, a first recovery manager, coupled to the first task, receives notification of the abnormal condition and provides the notification to a second recovery manager coupled to the second task. The second recovery manager then invokes recovery for the second task.

In yet a further embodiment of the invention, notification from the first recovery manager to the second recovery manager is sent via a communications manager of the computer system.

In another embodiment of the invention, the first recovery manager initiates recovery for the first task, and recovery for the first and second task is performed in parallel.

In addition to the above, initiating recovery for the second task includes, for example, determining from one or more recovery routines established for the first task that recovery for the second task is requested, and executing a recovery routine established for the second task when recovery is requested.

In another aspect of the invention, a recovery method is provided in which a first task of the computer system invokes a second task of the computer system. The first task is coupled to a first recovery manager and the second task is coupled to a second recovery manager. The second task initiates recovery for the first task in response to an abnormal condition within the computer system. The initiating includes the second recovery manager obtaining notification of the abnormal condition and providing the notification to the first recovery manager, and the first recovery manager invoking recovery for the first task, responsive to the notification.

In yet another aspect of the invention, a recovery method in an object-oriented computer system is provided. The computer system includes a first task, a second task and a communications manager. The second task initiates recovery for the first task when a predefined condition is met. The initiating includes the second task routing via the communications manager a recovery request for the first task. The recovery request identifies an object of the first task, which is usable in obtaining information located at the communications manager for invoking the recovery request. The recovery request is invoked by using the information to initiate a recovery routine established for the first task.

Systems corresponding to the above-disclosed methods are also included herein.

The recovery mechanism of the present invention advantageously allows recovery to be performed based on the logical invocation sequence of the tasks. This recovery can be performed automatically with one task automatically generating recovery for another task. Additionally, the recovery mechanism allows one task to initiate recovery for another task without involving the invoked task (i.e., allowing external entry of recovery for the task (i.e., outside of the task)). Further, in an object-oriented environment, the recovery mechanism of the present invention provides procedural recovery for the objects of the system. Additionally, recovery can be invoked for an object method automatically and external to the invoking object method. Further, in either a procedural or an object-oriented system, the recovery mechanism of the present invention allows two types of recovery to be performed in parallel—i.e., recovery for a particular task related stack and recovery based on the logical invocation sequence of the functions within the tasks. The recovery mechanism of the present invention also provides the ability to perform recovery for distributed cross-system (homogeneous, as well as heterogenous) functions.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a mechanism for enabling one task of a computer system to initiate recovery for another task is provided. This technique advantageously allows recovery to take place in logical invocation sequence order. Additionally, this technique provides for the coexistence of object oriented systems and procedural (i.e., stack based) recovery.

Figure 1A:
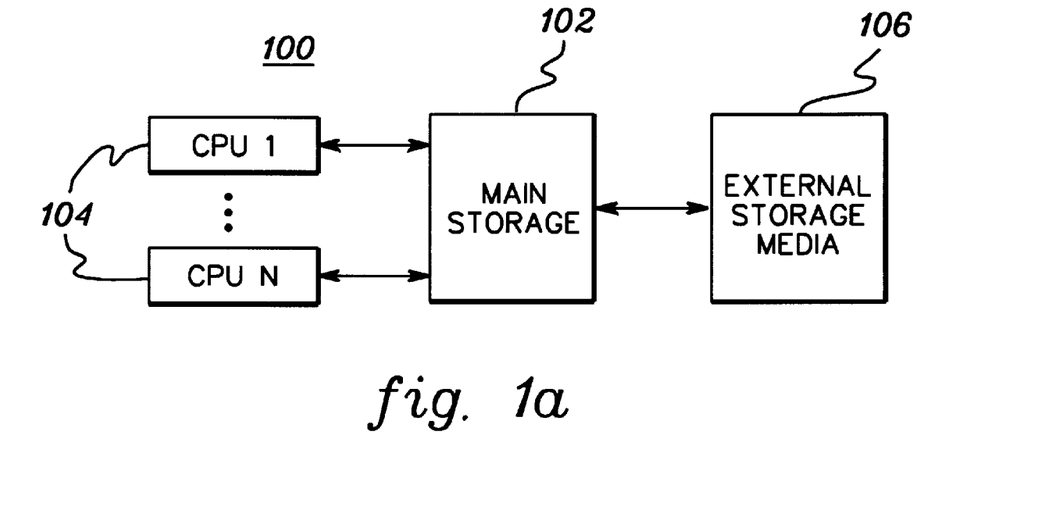
FIGS. 1a–1b depict examples of a computer system incorporating and using the recovery mechanism of the present invention.

In one embodiment, the recovery mechanism of the present invention is incorporated and used in a computer system 100 (FIG. 1a). In one example, computer system 100 is designed following the Enterprise Systems Architecture (ESA)/390 offered by International Business Machines Corporation (e.g., an ES/9000 Model 982). Enterprise Systems Architecture/390 is described in detail in "Enterprise Systems Architecture/390 Principles of Operation," Publication Number SA22-7201-02, Third Edition (February 1995), which is offered by International Business Machines Corporation, and is hereby incorporated herein by reference in its entirety. (ESA/390 is a trademark of International Business Machines Corporation.)

As shown in FIG. 1a, computer system 100 includes, for example, a main storage 102, one or more central processing units (CPUs) 104 and one or more external storage media 106. Each of these components is described in detail below.

Central processing units 104 contain the sequencing and processing facilities for instruction execution, interruption action, timing functions, initial program loading and other machine related functions. In one embodiment, one or more of central processing units 104 executes an operating system, such as, for example, the Multiple Virtual Storage (MVS)/ESA operating system, offered by International Business Machines Corporation. (MVS/ESA is a trademark of International Business Machines Corporation.) As is known, MVS/ESA controls the execution of programs running within the system and the processing of data. Additionally, in accordance with the principles of the present invention, MVS/ESA also controls the recovery technique of the present invention.

Central processing units 104 are coupled via, for example, one or more bi-directional buses to main storage 102. Main storage 102 is directly addressable and provides for high-speed processing of data by the central processing units. Main storage 102 can be physically integrated with the CPUs or constructed as stand-alone units.

Main storage 102 is further coupled via, for instance, a channel to external storage media 106. External storage media 106 may include, for instance, direct access storage devices (DASD), magnetic tapes, diskettes, and/or optical devices, to name a few. Both main storage 102 and external storage media 106 are computer usable media that may store computer program products as computer readable program code.

In other embodiments, computer system 100 may include a mainframe computer executing a Virtual Machine (VM) operating system offered by International Business Machines Corporation, an Intel processor based Personal Computer executing an IBM OS/2 Warp operating system, an Intel processor based Personal Computer executing a Microsoft Windows 95 operating system, or a Power PC based computer executing a UNIX operating system, to name a few.

Figure 1B:
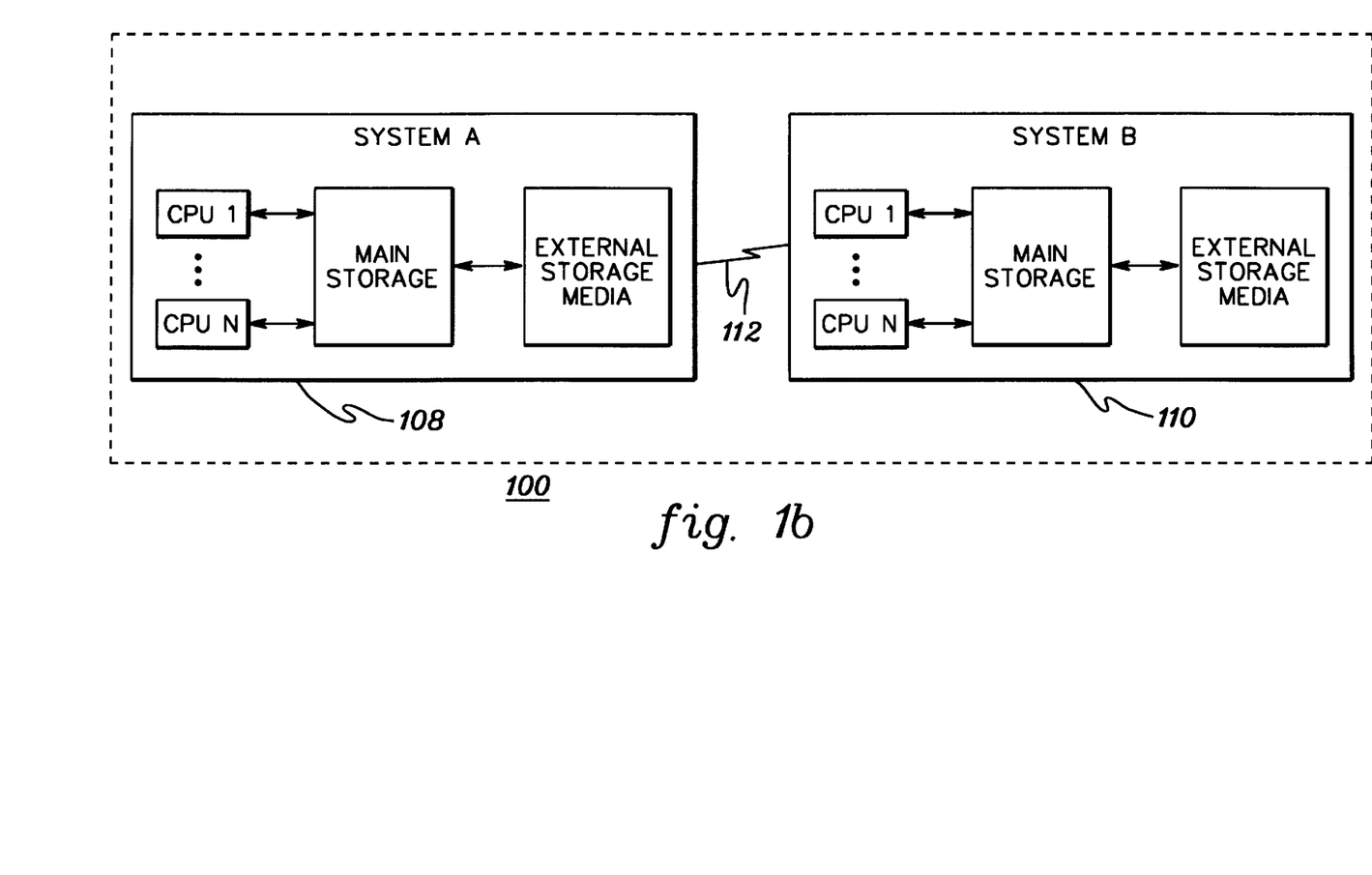

Additionally, computer system 100 may include two or more computer systems coupled to one another via, for example, a network. For example, in FIG. 1b, computer system 100 includes a first system 108 and a second system 110 coupled via a network 112. The coupled systems can be homogeneous or heterogeneous (e.g., different architectures and/or different operating systems) systems including the above-mentioned examples or other systems. Network 112 may include, for instance, a local or wide area network (e.g., a token ring or Ethernet) using Transmission Control Protocol/ Internet Protocol (TCP/IP), Internet Packet Exchange (IPX), Netware, or System Network Architecture (SNA), to name a few.

Figure 2:
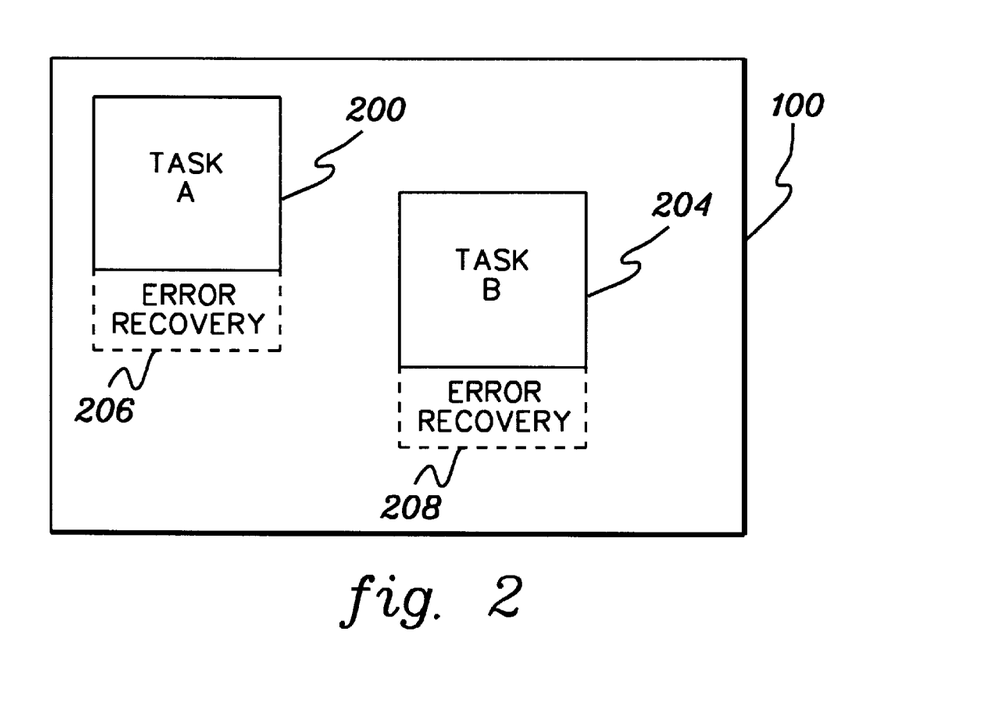
FIG. 2 depicts one embodiment of two tasks executing within a computer system of FIGS. 1a–1b, in accordance with the principles of the present invention.
Figure 3:
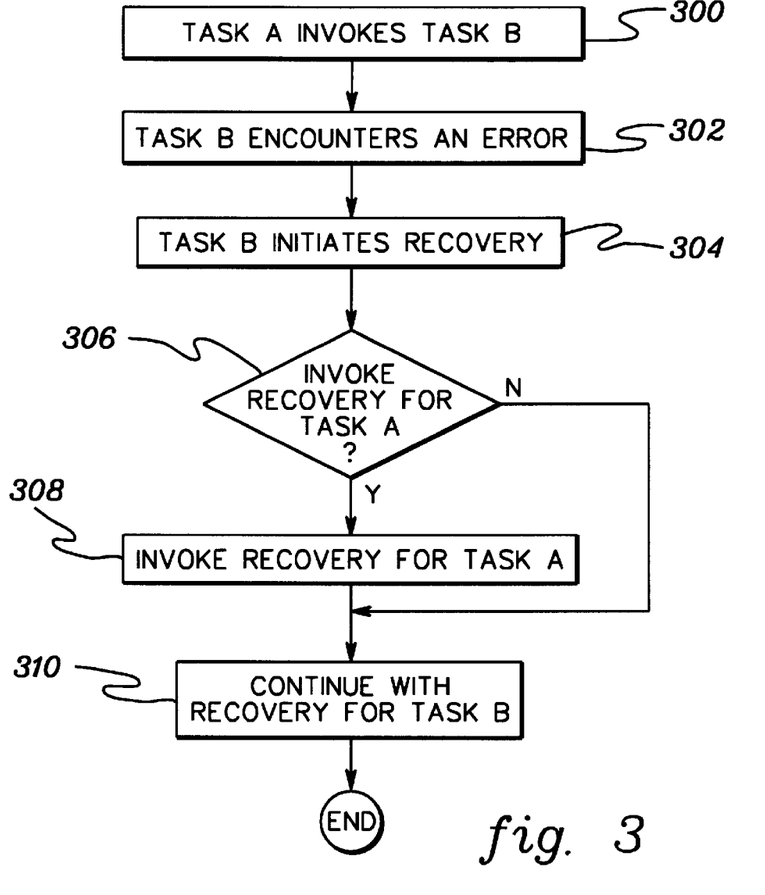
FIG. 3 depicts one example of a logic flow diagram illustrating an embodiment of an overview of the recovery mechanism of the present invention.

An overview of one implementation of the present invention, incorporated in and used with, for instance, computer system 100, is described below with reference to FIGS. 2 and 3. Referring to FIG. 2, in one example, two tasks, Task A (200) and Task B (204) are executable within computer system 100. Each task has associated therewith one or more levels of recovery 206, 208, respectively.

During execution, Task A invokes Task B, STEP 300 (FIG. 3), such that processing continues with Task B. During processing of Task B, Task B encounters an error, STEP 302, and recovery from the error is initiated, STEP 304. In particular, in one example, Task B begins executing one or more of its levels of recovery 208.

Additionally, in accordance with the principles of the present invention, a determination is made as to whether recovery is to be initiated for the invoking task, Task A, INQUIRY 306. If recovery is to be so initiated, then recovery is initiated for Task A, such that levels of recovery 206 are also invoked, STEP 308. Recovery then proceeds for Task A and Task B, in parallel. On the other hand, if recovery is not to be invoked for Task A, recovery for Task B continues and no recovery for Task A is invoked, STEP 310.

The recovery mechanism of the present invention, one example of which is described above, enables recovery of tasks to occur in a logical sequence, such as the sequence in which the tasks were invoked. In particular, one task can initiate recovery for another task. This can occur regardless of whether the tasks reside on the same system within the same or different address spaces, on different systems or whether the systems are homogeneous or heterogeneous. Additionally, the recovery technique used herein is independent of the invocation technique used between the tasks.

Figure 4:
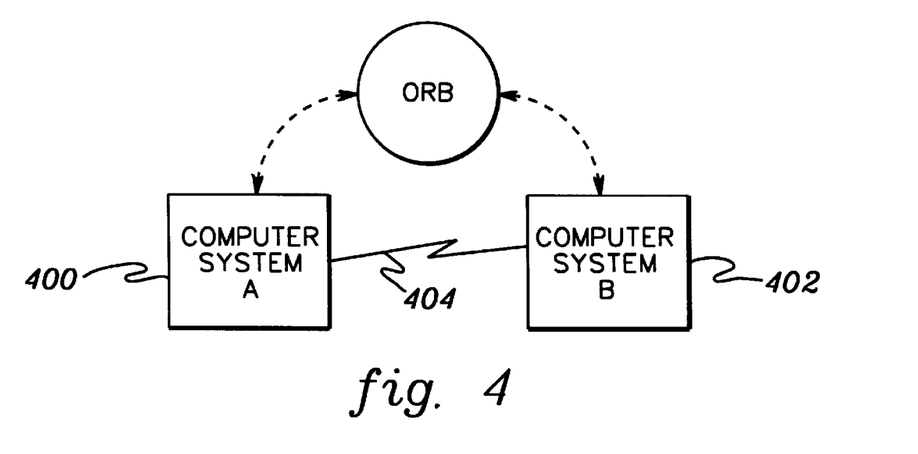
FIG. 4 depicts one embodiment of two computer systems coupled by a network and accessing an Object Request Broker (ORB), in accordance with the principles of the present invention.

Further details regarding the recovery mechanism of the present invention are described below with reference to the computer system depicted in FIG. 4 and the implementation example depicted in FIGS. 5a–5b. In this particular example, recovery is performed across two heterogenous computer systems coupled by a network. For example, Computer System A (400) of FIG. 4 is an Intel processor based Personal Computer executing an IBM OS/2 Warp operating system and Computer System B (402) is an International Business Machines Corporation mainframe computer executing MVS/ESA. In this one example, they are coupled to one another via a TCP/IP network (404).

Additionally, this particular example is described in relation to object-oriented programming concepts, which are known to those of ordinary skill in the relevant art. Specifically, a communications manager, such as, for instance, an Object Request Broker (ORB) 406 is used as the facilitator for sending and receiving messages between different objects and components of one or more systems. The ORB is a logical structure which is built on the operating system on either or both of the computer systems of this example. It provides the mechanism by which objects transparently make and receive requests and responses. In so doing, the ORB provides inter-operability between applications on different machines in heterogeneous distributed environments and seamlessly interconnects multiple object systems.

As is known in the art, a standard interface for the ORB is the Common Object Request Broker Architecture (CORBA). (CORBA is a registered trademark of the Object Management Group, Inc.) Examples of an ORB that comply with CORBA are Standard Object Model (SOM) and Distributed Standard Object Model (DSOM) offered by International Business Machines Corporation. (SOM and DSOM are trademarks of International Business Machines Corporation.) International Business Machines Corporation also offers a SOMobjects toolkit that uses SOM as its underlying technology and provides, for example, a framework for developing distributed object-oriented applications. The toolkit is described in, for example, "AIX Version 4.1 SOMobjects Base Toolkit User's Guide," International Business Machines Corporation, Publication Number SC23-2680-01, 1994; "AIX Version 4.1 SOMobjects Base Toolkit Programmer's Reference Manual," International Business Machines Corporation, Publication Number SC23-2681-01, 1994; and "CORBA—A Guide To Common Object Request Broker Architecture," by Ron Ben-Natan, McGraw-Hill 1995, which are hereby incorporated herein by reference in their entireties. Additionally, CORBA, SOM, and DSOM are further described in detail in "CORBA—A Guide To Common Object Request Broker Architecture," by Ron Ben-Natan, McGraw-Hill 1995, "Object-Oriented Programming Using SOM and DSOM," by Christina Lau, Van Nostrand Reinhold 1994, and "SOMobjects: Management Utilities for Distributed SOM," International Business Machines Corporation, Publication Number GG24-4479-00 (April 1995), all of which are hereby incorporated herein in their entireties.

Figure 5A:
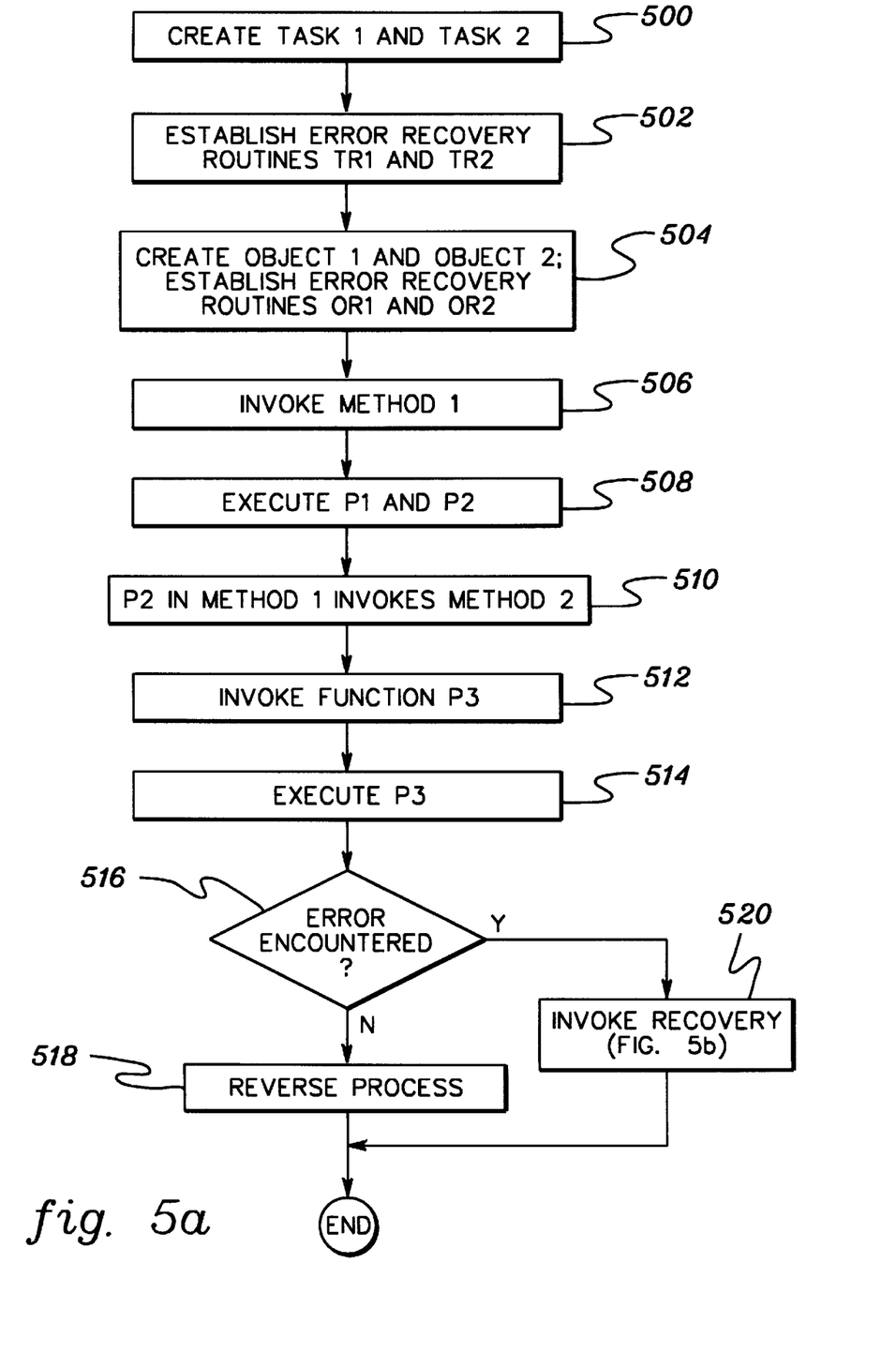
FIGS. 5a–5b depict a logic flow diagram of one embodiment of an implementation example of the recovery mechanism of the present invention.
Figure 5B:
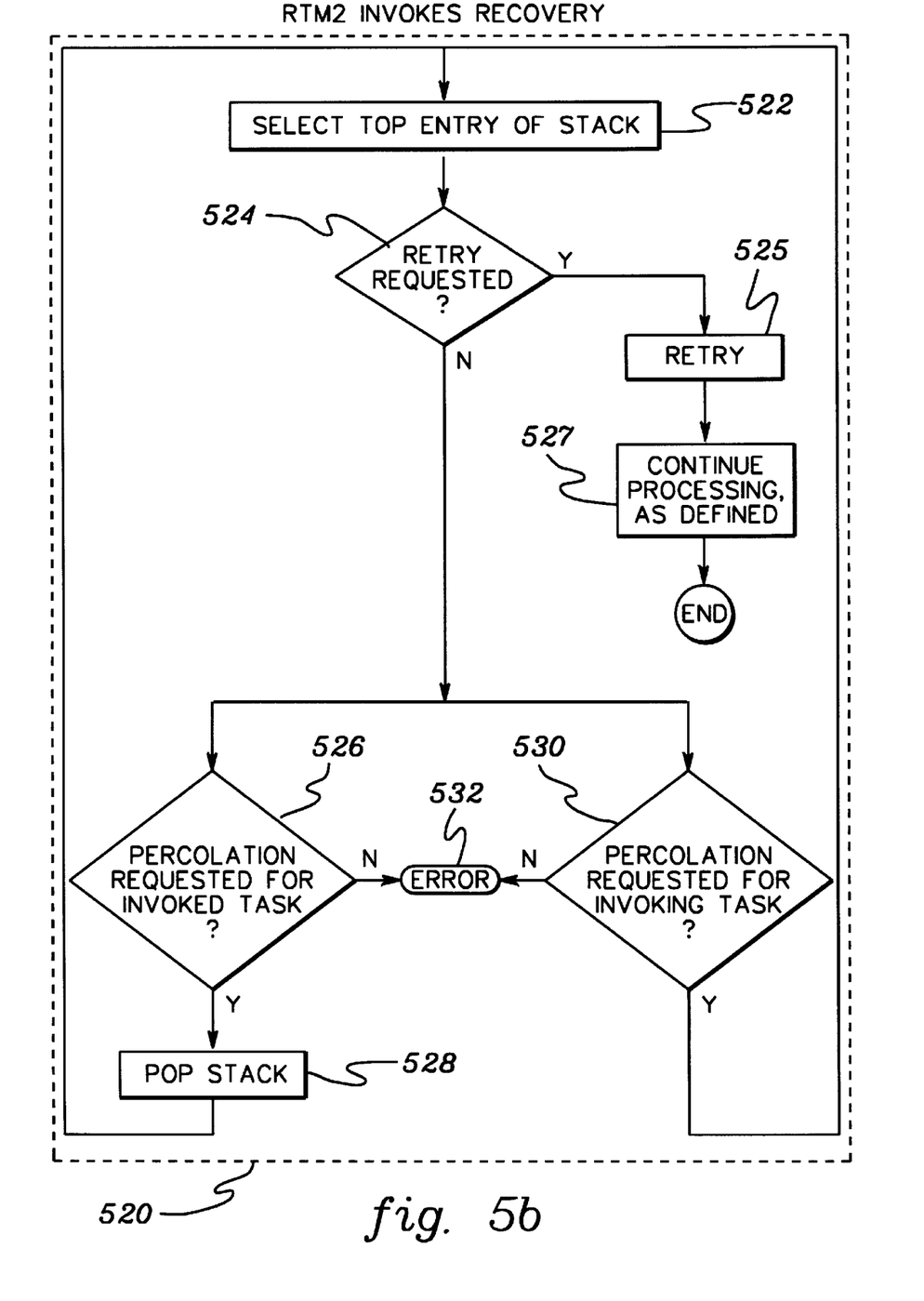

As mentioned previously, the particular example described herein with reference to FIGS. 5a–5b involves tasks running on different systems. In particular, initially two tasks are created, Task 1 of Computer System A and Task 2 of Computer System B, STEP 500 (FIG. 5a). As is known, a task may be created in a number of ways. For example, in MVS, a task is created by using the ATTACH macro, which creates a task control block (TCB) and sets the appropriate pointers to point to the program or programs of the task. As another known example, a task can be created using, for instance, the FORK statement of C.

Each task may have associated therewith an error recovery routine, TR1 and TR2, respectively, which is used when an error is encountered during processing, STEP 502. The error recovery routines are automatically created by the compiler or the runtime environment, or they are established by a programmer, as examples. As is known, a system macro (e.g., ESTAE in MVS) is used to associate the error recovery routine with its particular task. (See FIG. 6a for an example of a computer system with tasks initiated therein.)

Figure 6A:
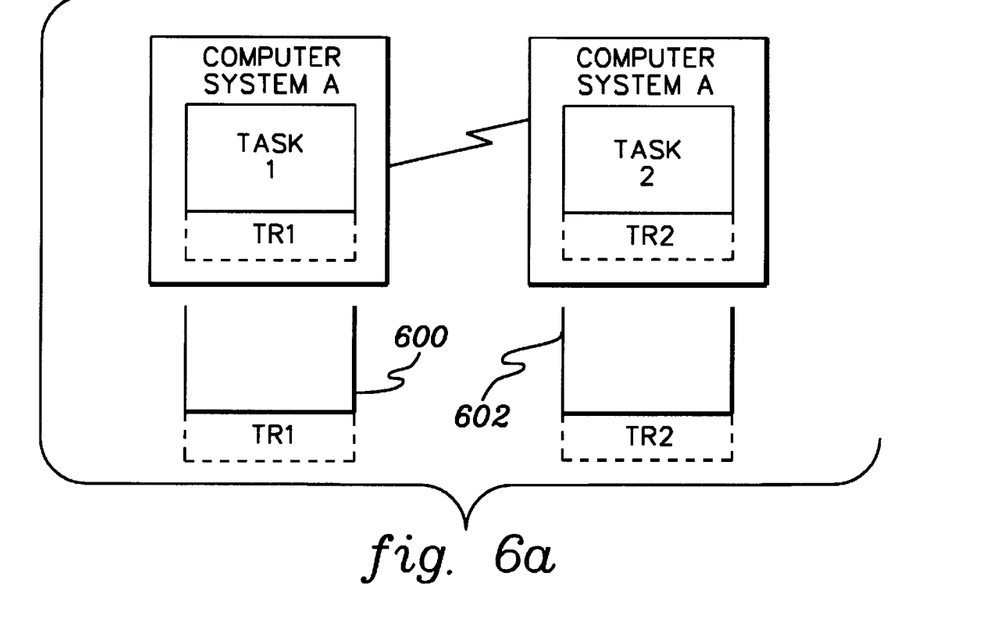
FIGS. 6a–6e depict various stages of the implementation example of the recovery mechanism of the present invention described with reference to FIGS. 5a–5b.

In one embodiment, when the tasks are executed, the error recovery routines are stored in data structures (such as, for instance, on logical stacks) for use, if an error occurs. The above-mentioned system macro is used to place the routines on the associated stacks (i.e., the addresses of the routines are placed on the stacks). For example, depicted in FIG. 6a is a stack 600 associated with Task 1 and including TR1 and a stack 602 associated with Task 2 and including TR2. The use of the stacks will be described in further detail below.

Additionally, in this example, an object is created within each task (i.e., e.g., Object 1 and Object 2) and an error recovery routine (i.e., OR1 and OR2) is established for each object, STEP 504. Error routines for objects are created in a manner similar to that for tasks and, as with the task error recovery routines, the object recovery routines are also added to the stacks, e.g., the top of the stacks. As is known, objects are instances of one or more classes and are created using known object-oriented techniques. For example, in C++, a class and an object of the class would be defined as follows:

```
Class Complex {
    .
    .
    .
    attributes of
      class
    .
    .
    .
};
Complex val;
```

In the above example, Class defines the class named Complex and Complex val creates an object named Val instantiated from the Complex class. In another particular example, in which DSOM is used, an object is created using a SomdCreateObj command.

In a CORBA environment, the created objects, along with their classes, are registered with the ORB, such that the ORB knows the name and location of the objects. In one instance, the ORB contains a registration table 610 (FIG. 6b), which includes, for example, the name of the object, the name of the class the object pertains to, the location of the object, the address space identifier for the object, if applicable, and the task the object is running under. Registration is a known procedure. However, in one embodiment, registration is accomplished using, for instance, inheritance from the SOMobject base class whose constructor method automatically communicates with SOM.

A class also defines methods (a.k.a., services or member functions) to which its objects respond. Specifically, the methods include the code necessary to perform functions on the data of one or more objects. In the above C++ example, the methods would be included in, for example, the class declaration after the attributes, as follows:

```
Class Complex {
    .
    .
    attributes
    .
    .
    integer direction();
};
``` wherein integer direction( ) tells the compiler that direction( ) is the name of a function that returns an integer value. In this case, the code for the function is defined in the body of the program (not shown), but in another example, it could have been included inline where the function is declared. Each method can include code to establish error recovery routines. In this example, each object includes a method (i.e., Method 1 and Method 2) and each method includes a recovery routine (MR1 and MR2). As with the other error recovery routines, MR1 and MR2 are placed on the top of their respective stacks, when the methods are invoked. Methods, as with objects, are registered with the ORB.

As is known, a method is invoked when its declaration is reached in the program, STEP 506. In one example, when Method 1 of Object 1 is invoked, the invocation is passed to the ORB and the ORB looks at registration table 610 and determines that Object 1 is on Computer System A and thus, passes the invocation to Computer System A for execution. During execution of Method 1, internal functions, which may be included in the method, are called. In this particular example, Method 1 includes two functions, P1 and P2, each of which has its own error recovery procedure, PR1 and PR2 (see FIG. 6c), STEP 508. The recovery functions can be provided by a programmer or automatically by the compiler.

As programmed, function P1 calls function P2, which in turn invokes Method 2 of Object 2 on Computer System B, STEP 510. As described above, the invocation is passed through the ORB, which determines where Method 2 is located. Subsequently, the ORB passes the invocation to Computer System B where it is processed. The invocation (or request) passed to Computer System B includes, for example, the invoker of Method 2 (i.e., Method 1 of Object 1).

Processing then continues within Method 2. In one example, Method 2 also includes a function, P3, P3 has an associated recovery routine PR3, which is placed on stack 602 when P3 is invoked, STEP 512 (see FIG. 6d). Thereafter, function P3 executes, STEP 514, and if no errors are encountered, INQUIRY 516, the invocation sequence is reversed until control returns to the proper location (e.g., Object 1), STEP 518.

However, if an error is encountered, INQUIRY 516, then the recovery mechanism of the present invention is invoked, STEP 520 (FIGS. 5a–5b). Specifically, for example, if an error is encountered during the processing of function P3 of Task 2 (i.e., function P3 detects a program error; or another program or the hardware detects an error within a function, such as P3, or within the system) then, error recovery is invoked either by the program or hardware encountering the error or by a service receiving control when an error is encountered.

One example of a service receiving control when an error is detected is referred to as the Recovery Termination Manager (RTM) of the MVS operating system. When an error is detected, RTM receives an interrupt indicating that an error has occurred. As is known, the interrupt can be initiated by the program detecting the error via, for instance, an ABEND macro, or by the hardware via a program check interrupt.

Logically, there is one RTM for each task of a system. That is, there is one RTM component per system, but the RTM operation for each task is independent from that task's viewpoint. Thus, in the above example, RTM 1 is associated with Task 1 and RTM 2 is associated with Task 2 (see FIG. 6e). Additionally, in accordance with one embodiment of the present invention, an RTM object (i.e., e.g., RTM1 object and RTM2 object) is created for each RTM (i.e., RTM 1 and RTM 2) and registered with the ORB. Additionally, each RTM object has associated therewith an error recovery method, ER1 and ER2, also registered with the ORB.

Figure 7A:
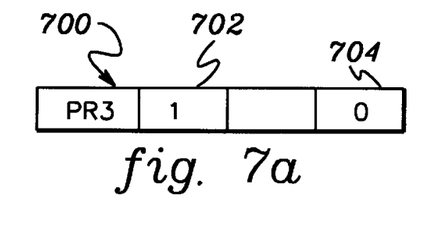
FIGS. 7a–7b depict examples of selected entries in a registration table of the Object Request Broker of FIG. 4, in accordance with the principles of the present invention.

When an error is encountered, the appropriate RTM (in this example, RTM 2) selects the top entry (e.g., PR3) of the applicable error recovery stack (e.g., stack 602), STEP 522. The selected entry 700 (FIG. 7a), as well as each other entry in the stacks, includes two indicators—a first indicator 702, which reflects whether retry of the failed operation or local percolation through the stack is to take place, and a second indicator 704, which reflects whether percolation is to proceed to another task (i.e., cross-task percolation), in accordance with the principles of the present invention. In particular, as one example, when indicator 702 contains a 0, retry is to occur, and when it contains a 1, local percolation is to occur. Similarly, a 0 in indicator 704 indicates no cross-task percolation and a 1 indicates cross-task percolation.

In this example, indicator 702 contains a 1 indicating to RTM 2 that local percolation, and not retry, is to occur, INQUIRY 524. Further, indicator 704 indicates that cross-task percolation is not requested, INQUIRY 526. Since local percolation is requested, RTM 2 pops PR3 from stack 602, STEP 528, and then selects the top entry of the stack, (e.g., MR2) once again, STEP 522.

If, in another example, retry was selected instead of local percolation, INQUIRY 524, then the failed operation would be retried in accordance with the procedures set up by the programmer, STEP 525, and processing would continue, as predefined, STEP 527.

Returning to STEP 522, in this example, the next entry selected is MR2. As shown by the indicators for the selected entry (see FIG. 7b), local percolation, INQUIRIES 524, 526, and cross-task percolation, INQUIRY 530, are requested (i.e., e.g., indicators 702 and 704 are set to 1). Thus, in one embodiment, the two percolations are performed in parallel.

For example, local percolation takes place in which MR2 is popped off of the stack, STEP 528, and the next entry of stack 602 (i.e., OR2) is selected, STEP 522. Additionally, in parallel, cross-task percolation is performed by invoking recovery for Task 1, in accordance with the principles of the present invention.

Figure 7B:
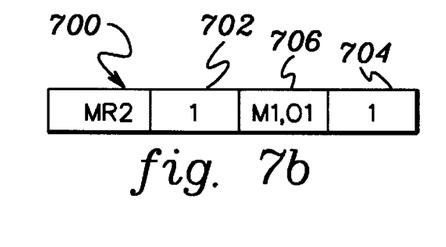

In particular, in one example, when cross-task percolation is requested, RTM 2 signals RTM 1 via the ORB that an error occurred in Method 2 of Object 2. Specifically, RTM 2 sends the following message, as an example, to the RTM2 object registered with the ORB: "Error in (Object 2,Method 2), Signal (Method 1,Object 1)". RTM 2 knew which method was the invoking method, since this information was sent during the invocation of Method 2 and as is shown in FIG. 7b is stored in the logical stack entry (e.g., at position 706). Upon receipt of the signal, the ORB uses conventional communication techniques to route the message to the proper method of the object associated with RTM 1.

Figure 6B:
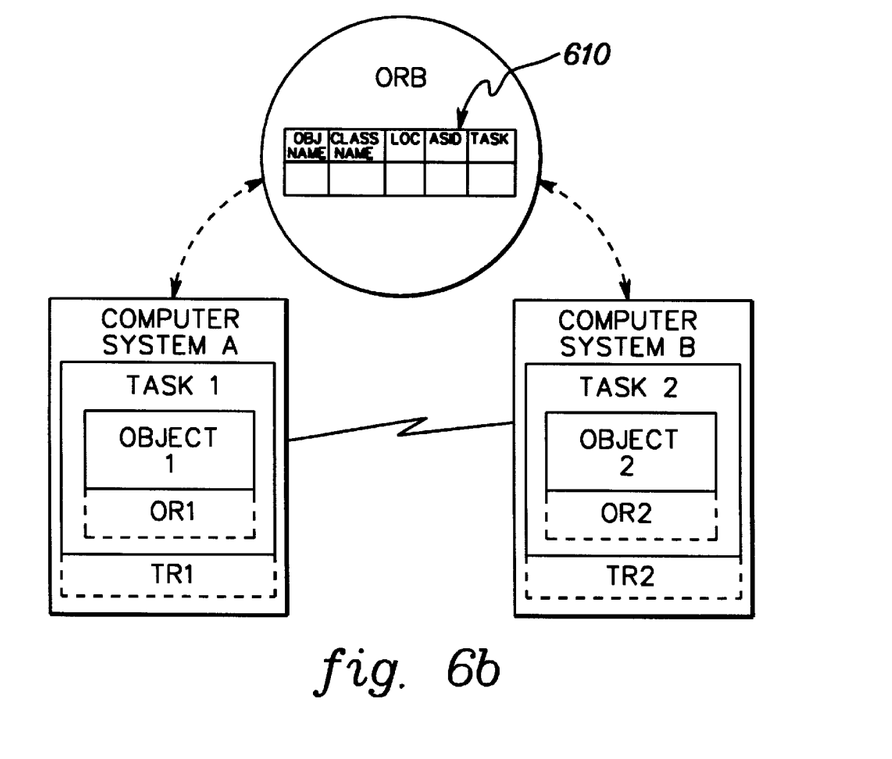
Figure 6C:
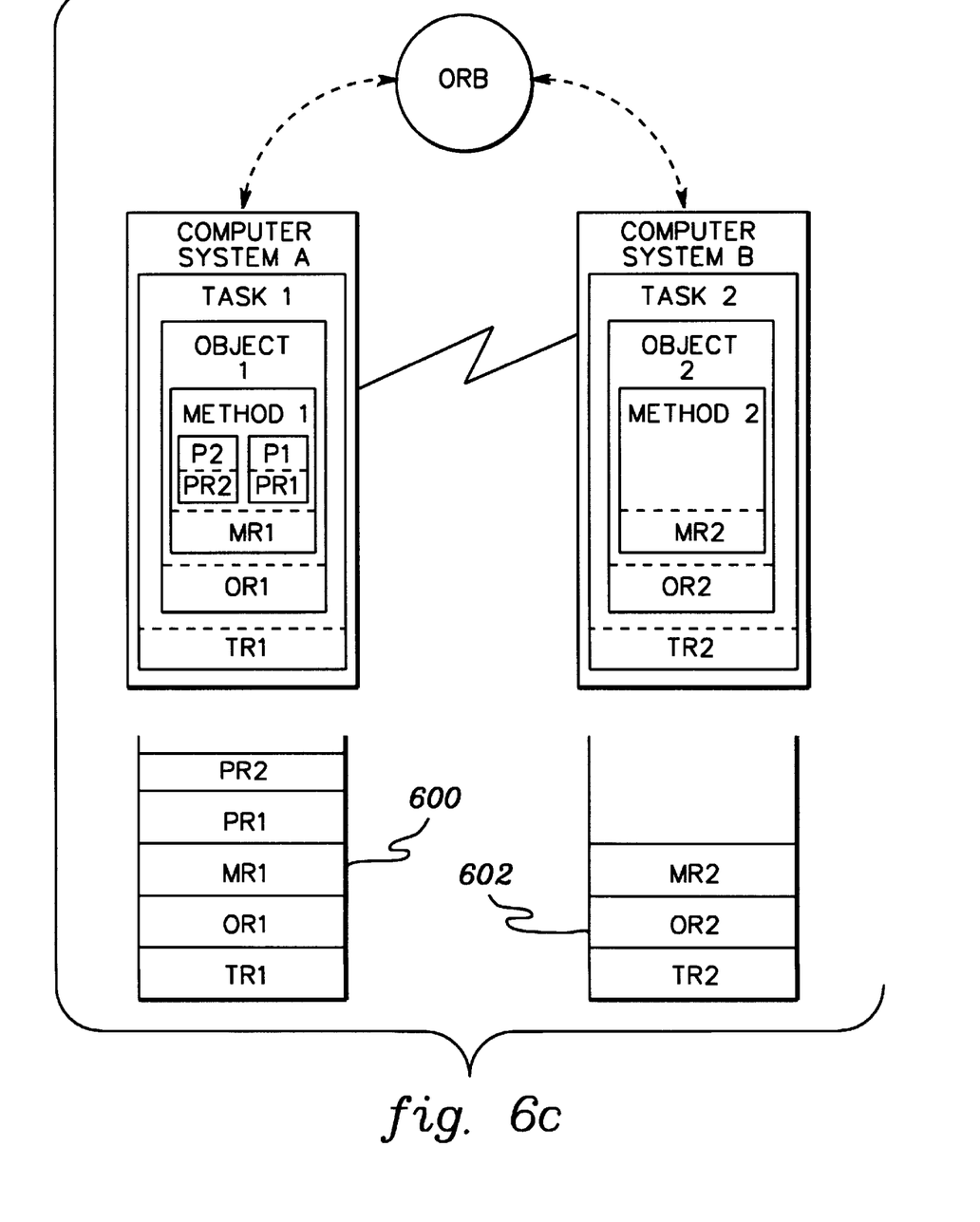
Figure 6D:
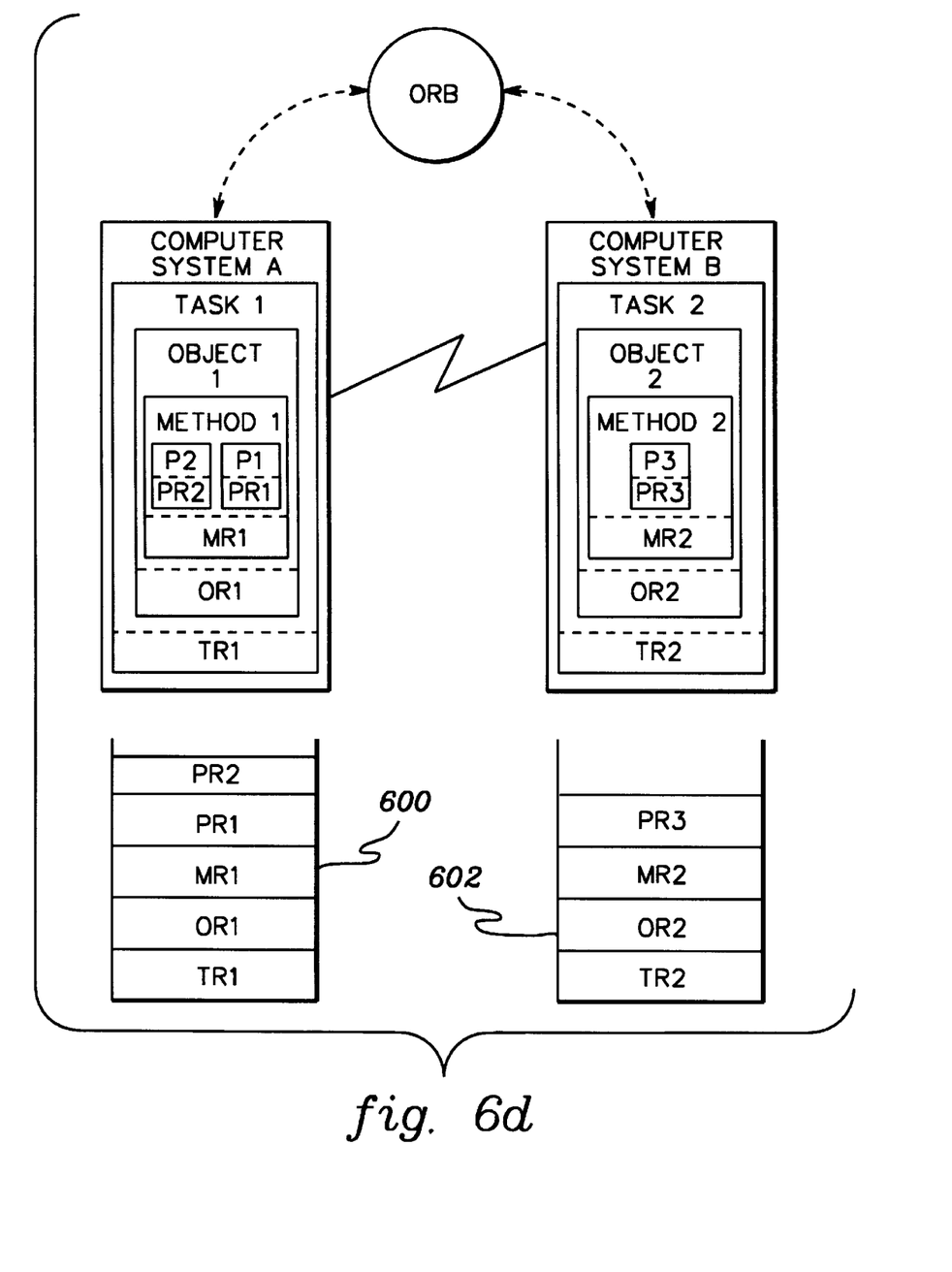
Figure 6E:
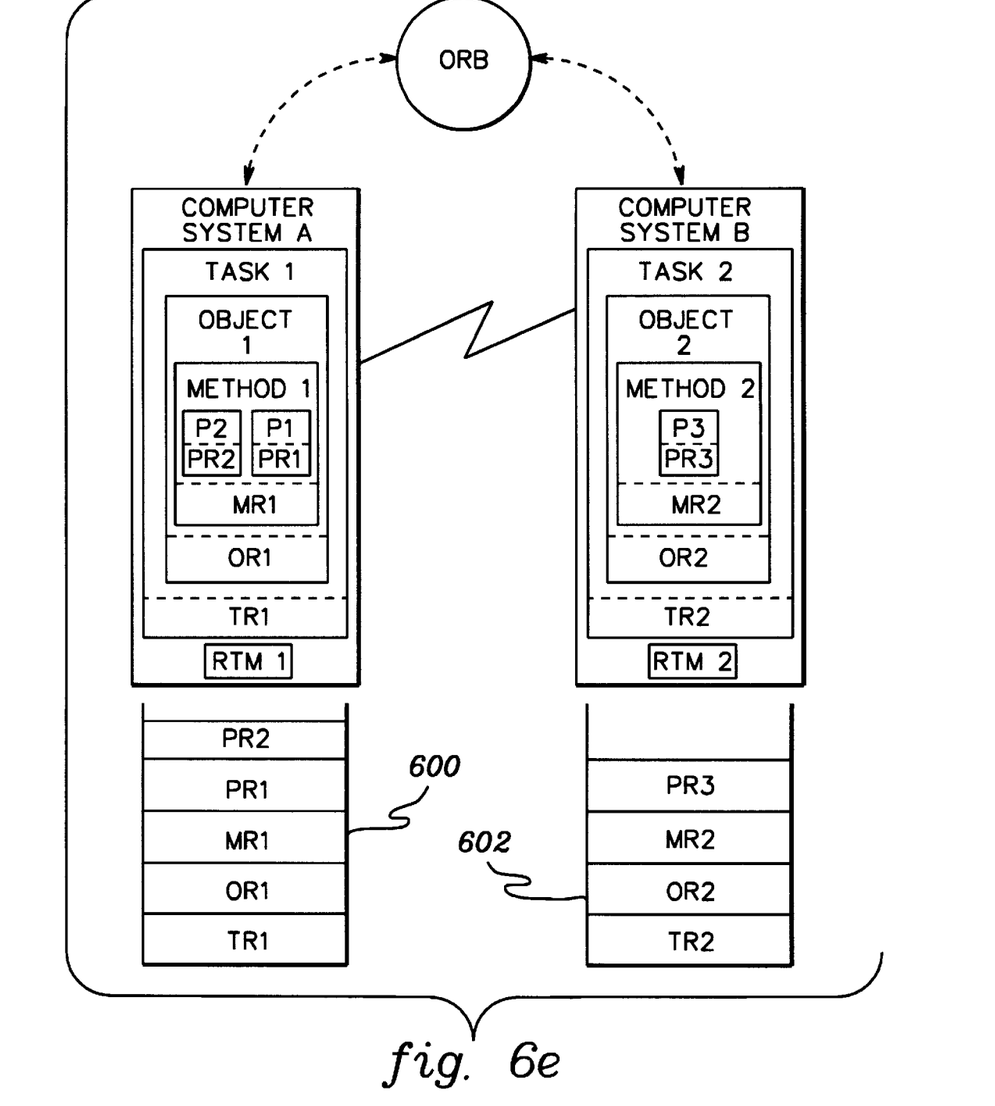

For example, as is known, the ORB uses registration table 610 (one example of which is depicted in FIG. 6b) to route the invocation to the proper object on the proper system, in the proper address space, and under the proper task. Specifically, the ORB uses the name of the object to which the request is to be routed to look up the needed information from the registration table. The ORB implicitly knows the task, ASID, and system of the invoker from the invocation linkage, and as stated above, explicitly knows the object and method names from the invocation. Since the ORB knows all of the relevant information, the ORB can pass the recovery request to the particular object and method.

In particular, in one embodiment, the ORB routes the request to the RTM1 object and, in particular, to the ER1 method of the RTM1 object using the procedure described above. The request includes, for instance a new error code defining this request as a cross-task request. Thereafter, the ER1 method signals RTM 1 on Computer System A to invoke recovery for Task 1. Specifically, in one example, the top of stack 600 is selected, STEP 522, which in this particular case is PR2, and the process proceeds, as described above with the new error code presented to Task 1 recovery as the code of error.

Returning to INQUIRY 524, if in another example, retry was not requested and either was local percolation, INQUIRY 526, or cross-task percolation, INQUIRY 530, then an error is signaled, STEP 532.

As described in detail above, the mechanism of the present invention advantageously allows one task to automatically invoke recovery for another task, such that recovery can follow the logical invocation sequence of the functions within the tasks. The logic flow diagrams described in detail above are only examples of the recovery mechanism of the present invention. It will be apparent to those of ordinary skill in the art that there can be many variations to the above, including, for instance, processing more or less than the steps described in the flow diagrams, modifying one or more of the steps, or changing the order of some of the steps without departing from the spirit of the invention. These variations are, therefore, considered a part of the claimed invention. Additionally, the object-oriented structures and commands described above, including, but not limited to, the registration table of the ORB, are only examples. Many other structures and/or commands may be used. Further, the registration table can include more or less than the information depicted and described herein without departing from the spirit of the invention. Additionally, the use of an ORB (e.g., SOM or DSOM) as the communications means is also not necessary. It is possible to use other non-architectural means, such as, for example, POST/WAIT (a MVS macro for communicating between tasks), an Event Notification Facility (ENF) of MVS, and shared storage. Further, in another embodiment, one data structure, such as one stack, can be used to store the error recovery routines. This stack, however, would be kept in logical invocation sequence order, wherein the top of the stack (as one example) would include the error routine for the latest invoked operation. Further, in another embodiment, one RTM would not invoke recovery via another RTM, but merely sends a message to the invoking object indicating an error and the other object's stack would decide what action to take. All of these variations and more are therefore, considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A dynamic recovery method in a computer system, said computer system comprising a multi-tasking computer system having a kernel controlling a plurality of threads, said recovery method comprising:

detecting, by a first task of said computer system, an abnormal condition within said computer system;

initiating, by said first task, recovery for a second task of said computer system, said initiating being responsive to said abnormal condition; and     wherein said first task and said second task comprise independent threads, of said plurality of threads, of execution of program instructions within said multi-tasking computer system.

2. The recovery method of claim 1, further comprising invoking said first task by said second task prior to said detecting.

3. The recovery method of claim 1, wherein said computer system comprises a first recovery manager on said kernel coupled to said first task and a second recovery manager coupled to said second task, and wherein said initiating comprises:

said first recovery manager receiving notification of said abnormal condition; and     providing said notification from said first recovery manager to said second recovery manager, said second recovery manager invoking said recovery for said second task responsive to said providing by said first recovery manager.

4. The recovery method of claim 3, wherein said providing comprises sending said notification from said first recovery manager to said second recovery manager on said kernel via a communications manager of said computer system.

5. The recovery method of claim 3, further comprising:

initiating, by said first recovery manager, recovery for said first task; and     performing recovery for said first task and said second task in parallel.

6. The recovery method of claim 1, wherein said initiating comprises:

determining from one or more recovery routines established for said first task that recovery for said second task is requested; and     executing a recovery routine established for said second task when said recovery is requested.

7. The recovery method of claim 6, wherein said determining comprises examining an indicator located in said one or more recovery routines to determine that recovery for said second task is requested.

8. The recovery method of claim 6, further comprising performing recovery for said first task in parallel with said recovery for said second task.

9. The recovery method of claim 8, wherein said performing recovery for said first task comprises executing at least one of said one or more recovery routines established for said first task.

10. The recovery method of claim 6, wherein said one or more recovery routines established for said first task are included in a first data structure coupled to said first task, and said recovery routine established for said second task is included in a second data structure coupled to said second task.

11. The recovery method of claim 6, wherein said one or more recovery routines established for said first task and said recovery routine established for said second task are included in a data structure, said data structure being in logical invocation sequence order.

12. The recovery method of claim 1, wherein said computer system comprises a first computer system coupled with a second computer system, wherein said kernel comprises a first kernel of said first computer system coupled with a second kernel of said second computer system, and wherein said first task is executable on said first computer system and said second task is executable on said second computer system.

13. The recovery method of claim 12, wherein said first computer system and said second computer system are heterogeneous systems.

14. The recovery method of claim 1, wherein said computer system comprises an object-oriented system, said first task comprises at least one of a first object and a first method for said first object, and said second task comprises at least one of a second object and a second method for said object.

15. A dynamic recovery method in a computer system, said computer system comprising a multi-tasking computer system having a kernel controlling a plurality of threads, said recovery method comprising:
    invoking, by a first task of said computer system, a second task of said computer system, said first task being coupled to a first recovery manager on said kernel of said computer system and said second task being coupled to a second recovery manager on said kernel of said computer system;
    initiating, by said second task, recovery for said first task, said initiating being responsive to an abnormal condition within said computer system and comprising:
        said second recovery manager obtaining notification of said abnormal condition and providing said notification to said first recovery manager;
        said first recovery manager invoking recovery for said first task, responsive to said notification; and
    wherein said first task and said second task comprise independent threads, of said plurality of threads, of execution of program instructions within said multi-tasking computer system.

16. The recovery method of claim 15, wherein said providing comprises forwarding said notification from said second recovery manager to said first recovery manager on said kernel via a communications manager of said computer system coupled to said first recovery manager and said second recovery manager.

17. The recovery method of claim 15, further comprising said second recovery manager invoking recovery for said second task, said recovery for said first task and said second task performable in parallel.

18. The recovery method of claim 15, wherein said initiating comprises:
    determining from one or more recovery routines established for said second task that recovery for said first task is requested; and
    executing a recovery routine established for said first task when said recovery is requested.

19. A dynamic recovery method in an object-oriented, multi-tasking computer system comprising a first task, a second task and a communications manager on a kernel controlling a plurality of threads, said first task and said second task comprising independent threads, of said plurality of threads, of execution of program instructions within said multi-tasking computer system, said recovery method comprising:
    initiating, by said second task, recovery for said first task, when a pre-defined condition is met, said initiating comprising:
        said second task routing via said communications manager a recovery request for said first task, said recovery request identifying an object of said first task, said object usable in obtaining information located at said communications manager for invoking said recovery request; and
        invoking said recovery request by using said information to initiate a recovery routine established for said first task.

20. The recovery method of claim 19, further comprising using said object to look-up in a registration table stored within said communications manager said information usable in invoking said recovery request.

21. The recovery method of claim 19, wherein said object-oriented computer system comprises a first recovery manager on said kernel coupled to said first task and a second recovery manager on said kernel coupled to said second task, and wherein said routing comprises forwarding said recovery request from said second recovery manager to said first recovery manager via said communications manager.

22. The recovery method of claim 21, wherein said invoking comprises invoking said recovery routine by said first recovery manager.

23. The recovery method of claim 21, further comprising creating a first recovery manager object for said first recovery manager and a second recovery manager object for said second recovery manager, said first and second recovery manager objects registrable with said communications manager, and wherein said forwarding comprises forwarding said recovery request from said second recovery manager to said first recovery manager via said second recovery manager object and said first recovery manager object.

24. The recovery method of claim 19, wherein said initiating comprises determining from one or more recovery routines established for said second task that recovery for said first task is requested, said one or more recovery routines includable in a data structure coupled to said second task.

25. A dynamic recovery system in a multi-tasking computer system having a kernel controlling a plurality of threads, said recovery system comprising:
    means for detecting, by a first task of said computer system, an abnormal condition within said computer system;
    means for initiating, by said first task, recovery for a second task of said computer system, said initiating being responsive to said abnormal condition; and wherein said first task and said second task comprise independent threads, of said plurality of threads, of execution of program instructions within said multi-tasking computer system.

26. The recovery system of claim 25, further comprising means for invoking said first task by said second task prior to said detecting.

27. The recovery system of claim 25, wherein said computer system comprises a first recovery manager on said kernel coupled to said first task and a second recovery manager on said kernel coupled to said second task, and wherein said means for initiating comprises:
said first recovery manager being adaptable to receive notification of said abnormal condition and to provide said notification to said second recovery manager; and
said second recovery manager being adaptable to invoke said recovery for said second task responsive to said providing by said first recovery manager.

28. The recovery system of claim 27, further comprising a communications manager, and wherein said first recovery manager is adaptable to send said notification to said second recovery manager via said communications manager.

29. The recovery system of claim 27, further comprising:
said first recovery manager being adaptable to initiate recovery for said first task; and
means for performing recovery for said first task and said second task in parallel.

30. The recovery system of claim 25, wherein said means for initiating comprises:
means for determining from one or more recovery routines established for said first task that recovery for said second task is requested; and
means for executing a recovery routine established for said second task when said recovery is requested.

31. The recovery system of claim 30, wherein said means for determining comprises means for examining an indicator located in said one or more recovery routines to determine that recovery for said second task is requested.

32. The recovery system of claim 30, further comprising means for performing recovery for said first task in parallel with said recovery for said second task.

33. The recovery system of claim 32, wherein said means for performing recovery for said first task comprises means for executing at least one of said one or more recovery routines established for said first task.

34. The recovery system of claim 30, further comprising a first data structure coupled to said first task, said first data structure including said one or more recovery routines established for said first task, and a second data structure coupled to said second task, said second data structure including said recovery routine established for said second task.

35. The recovery system of claim 30, further comprising a data structure, said data structure including said one or more recovery routines established for said first task and said recovery routine established for said second task, said data structure being in logical invocation sequence order.

36. The recovery system of claim 25, wherein said computer system comprises of first computer system coupled with a second computer system, wherein said kernel comprises a first kernel of said first computer system coupled with a second kernel of said second computer system, and wherein said first task is executable on said first computer system and said second task is executable on said second computer system.

37. The recovery system of claim 36, wherein said first computer system and said second computer system are heterogeneous systems.

38. The recovery system of claim 25, wherein said computer system comprises an object-oriented system, said first task comprises at least one of a first object and a first method for said first object, and said second task comprises at least one of a second object and a second method for said object.

39. A dynamic recovery system in a multi-tasking computer system having a kernel controlling a plurality of threads, said recovery system comprising:
a first task of said computer system being adaptable to invoke a second task of said computer system, said first task being coupled to a first recovery manager on said kernel of said computer system and said second task being coupled to a second recovery manager on said kernel of said computer system;
means for initiating, by said second task, recovery for said first task, said initiating being responsive to an abnormal condition within said computer system and comprising:
said second recovery manager being adaptable to obtain notification of said abnormal condition and to provide said notification to said first recovery manager;
said first recovery manager being adaptable to invoke recovery for said first task, responsive to said notification; and
wherein said first task and said second task comprise independent threads, of said plurality of threads, of execution of program instructions within said multi-tasking computer system.

40. The recovery system of claim 39, further comprising a communications manager on said kernel coupled to said first recovery manager and said second recovery manager, and wherein said notification is forwardable from said second recovery manager to said first recovery manager via said communications manager.

41. The recovery system of claim 39, further comprising said second recovery manager being adaptable to invoke recovery for said second task, said recovery for said first task and said second task being performable in parallel.

42. The recovery system of claim 39, wherein said means for initiating comprises:
means for determining from one or more recovery routines established for said second task that recovery for said first task is requested; and
means for executing a recovery routine established for said first task when said recovery is requested.

43. A dynamic recovery system in an object-oriented, multi-tasking computer system comprising a first task, a second task and a communications manager on a kernel controlling a plurality of threads, said first task and said second task comprising independent threads, of said plurality of threads, of execution of program instructions within said multi-tasking computer system, said recovery system comprising:
means for initiating, by said second task, recovery for said first task, when a pre-defined condition is met, said means for initiating comprising:
said second task being adaptable to route via said communications manager a recovery request for said first task, said recovery request identifying an object of said first task, said object usable in obtaining information located at said communications manager for invoking said recovery request; and
means for invoking said recovery request by using said information to initiate a recovery routine established for said first task.

44. The recovery system of claim 43, further comprising means for using said object to look-up in a registration table stored within said communications manager said information usable in invoking said recovery request.

45. The recovery system of claim 43, wherein said object-oriented computer system comprises a first recovery manager on said kernel coupled to said first task and a second recovery manager on said kernel coupled to said second task, and wherein said recovery request is routable from said second recovery manager to said first recovery manager via said communications manager.

46. The recovery system of claim 45, wherein said means for invoking comprises said first recovery manager being adaptable to invoke said recovery routine.

47. The recovery system of claim 45, further comprising means for creating a first recovery manager object for said first recovery manager and a second recovery manager object for said second recovery manager, said first and second recovery manager objects being registrable with said communications manager, and wherein said recovery request is forwardable from said second recovery manager to said first recovery manager via said second recovery manager object and said first recovery manager object.

48. The recovery system of claim 43, wherein said means for initiating comprises means for determining from one or more recovery routines established for said second task that recovery for said first task is requested, said one or more recovery routines includable in a data structure coupled to said second task.

49. The dynamic recovery method of claim 1, further comprising establishing a recovery environment for said first task at or after creation of said first task.

* * * * *

UNITED STATES PATENT AND TRADEMARK OFFICE
CERTIFICATE OF CORRECTION

PATENT NO. : 6,035,419
DATED : March 7, 2000
INVENTOR(S) : Breslau et al.

It is certified that error appears in the above-identified patent and that said Letters Patent is hereby corrected as shown below:

IN THE CLAIMS:

Claim 28, Col. 13, line 19, after "manager", insert --on said kernel--.

Signed and Sealed this

Sixth Day of March, 2001

Attest:

NICHOLAS P. GODICI

Attesting Officer     Acting Director of the United States Patent and Trademark Office